US011504803B2

(12) United States Patent
Mizuta et al.

(10) Patent No.: US 11,504,803 B2
(45) Date of Patent: Nov. 22, 2022

(54) LASER PROCESSING APPARATUS AND LASER PROCESSING METHOD (71) Applicant: HAMAMATSU PHOTONICS K.K., Hamamatsu (JP)

(72) Inventors: Yoshio Mizuta, Hamamatsu (JP); Takashi Kurita, Hamamatsu (JP); Takeshi Watari, Hamamatsu (JP); Yuki Kabeya, Hamamatsu (JP); Norio Kurita, Hamamatsu (JP); Toshiyuki Kawashima, Hamamatsu (JP)

(73) Assignee: HAMAMATSU PHOTONICS K.K, Hamamatsu (JP)

( * ) Notice: Subject to any disclaimer, the term of this patent is extended or adjusted under 35 U.S.C. 154(b) by 516 days.

(21) Appl. No.: 16/256,031

(22) Filed: Jan. 24, 2019

(65) Prior Publication Data
US 2019/0232423 A1 Aug. 1, 2019

(30) Foreign Application Priority Data

Jan. 30, 2018 (JP) .............................. JP2018-013783

(51) Int. Cl.
*B23K 26/06* (2014.01)
*C21D 10/00* (2006.01)
(Continued)

(52) U.S. Cl.
CPC ........ *B23K 26/0622* (2015.10); *B23K 26/009* (2013.01); *B23K 26/356* (2015.10); *C21D 10/005* (2013.01)

(58) Field of Classification Search
CPC .. B23K 26/0622; B23K 26/009; B23K 26/36; B23K 26/0624; B32K 26/0626; C21D 10/005
See application file for complete search history.

(56) References Cited

U.S. PATENT DOCUMENTS 4,058,486 A * 11/1977 Mallozzi ................... H01S 4/00
372/5
5,571,575 A * 11/1996 Takayanagi ............ B23K 26/18
427/178

(Continued)

FOREIGN PATENT DOCUMENTS

EP 1260838 A2 * 11/2002 ......... B23K 26/0624
JP S58-207321 A 12/1983
(Continued)

OTHER PUBLICATIONS

Machine translation of EP1260838A2, Jan. 2022. (Year: 2022).*

*Primary Examiner* — Geoffrey S Evans
(74) *Attorney, Agent, or Firm* — Faegre Drinker Biddle & Reath LLP (57) ABSTRACT A laser processing apparatus includes a light source which outputs a laser light, and a waveform control unit which controls a pulse waveform of the laser light irradiating the workpiece, in which the pulse waveform of the laser light controlled by the waveform control unit includes a main pulse and a foot pulse temporally preceding the main pulse, and a peak intensity of the foot pulse is smaller than a peak intensity of the main pulse, and a peak position of the main pulse is positioned in a retention time period of plasma generated due to an incidence of the foot pulse on the workpiece.

10 Claims, 6 Drawing Sheets (51) Int. Cl.
B23K 26/0622 (2014.01)
B23K 26/00 (2014.01)
B23K 26/356 (2014.01)

(56) References Cited

U.S. PATENT DOCUMENTS

| | | | | |
|---|---|---|---|---|
| 5,674,328 A | * | 10/1997 | Mannava | C21D 10/005 148/525 |
| 5,932,120 A | * | 8/1999 | Mannava | C21D 10/005 219/121.85 |
| 6,191,385 B1 | * | 2/2001 | Loughlin | C21D 10/005 219/121.6 |
| 2003/0183603 A1 | * | 10/2003 | Forsman | B23K 26/0622 219/121.61 |
| 2005/0218122 A1 | * | 10/2005 | Yamamoto | B23K 26/0622 219/121.61 |
| 2006/0016790 A1 | * | 1/2006 | Yeik | B23K 26/0622 219/121.61 |
| 2006/0249816 A1 | | 11/2006 | Li et al. | |
| 2009/0310628 A1 | * | 12/2009 | Yamazaki | B23K 26/705 372/6 |
| 2015/0336208 A1 | * | 11/2015 | Sokol | B23K 26/356 219/121.61 |

FOREIGN PATENT DOCUMENTS

| | | | |
|---|---|---|---|
| JP | 07016781 A | * 1/1995 | |
| JP | 07273387 A | * 10/1995 | ......... B23K 26/0622 |
| JP | 3373638 B2 | 2/2003 | |
| JP | 4215981 B2 | 1/2009 | |
| JP | 2009-202234 A | 9/2009 | |
| JP | 2015-093284 A | 5/2015 | |
| KR | 20110137031 A | 12/2011 | |

* cited by examiner

LASER PROCESSING APPARATUS AND LASER PROCESSING METHOD

TECHNICAL FIELD

The present disclosure relates to a laser processing apparatus and a laser processing method.

BACKGROUND

Conventionally, a laser processing method called laser peening is known. In this laser processing method, pulsed laser light is radiated to a surface of a workpiece such as a metal to generate plasma on a metal surface and the metal is plastically deformed by a shock wave generated by a plasma pressure (see, for example, Japanese Unexamined Patent Publication No. S58-207321, Japanese Patent No. 4215981, Japanese Patent No. 3373638). By causing plastic deformation to be generated, effects such as improvement in fatigue strength of a workpiece and suppression of stress corrosion cracking are expected. Therefore, such a laser processing method has begun to be used as a processing technology in fields requiring high safety such as aircraft or nuclear reactors.

SUMMARY

However, with this conventional laser processing method, there is simply modification of properties or reforming of a surface of a workpiece, and it is difficult to perform a process such as generating a residual stress deep inside a workpiece. With simply increasing the fluence of laser light in the conventional laser processing method, controllability of a peak position of a residual stress inside a workpiece is poor and disseminating it in fields requiring mass productivity has been difficult.

The present disclosure has been made to solve the above-described problems and an objective thereof is to provide a laser processing apparatus and a laser processing method capable of generating a residual stress deep inside a workpiece.

A laser processing apparatus according to an aspect of the present disclosure is a laser processing apparatus which performs processing by irradiating a workpiece with a laser light and includes a light source which outputs the laser light, and a waveform control unit which controls a pulse waveform of the laser light irradiating the workpiece, in which the pulse waveform of the laser light controlled by the waveform control unit includes a main pulse and a foot pulse temporally preceding the main pulse, and a peak intensity of the foot pulse is smaller than a peak intensity of the main pulse, and a peak position of the main pulse is positioned in a retention time of plasma period generated due to an incidence of the foot pulse on the workpiece.

In this laser processing apparatus, plasma having a sufficiently low density with respect to the workpiece is generated on a surface of the workpiece by irradiating the workpiece with the foot pulse temporally earlier than the main pulse. Thereafter, by irradiating the workpiece with the main pulse having a peak intensity higher than that of the foot pulse in the retention time period of the plasma, the plasma acts as a low-density ablator and a strong shock wave increased by a difference in shock impedance can be generated inside the workpiece. Thereby, in this laser processing apparatus, a residual stress can be generated deep inside the workpiece.

Also, the pulse waveform of the laser light may include a single main pulse and a single foot pulse. Thereby, plasma can be more reliably generated on the surface of the workpiece by the foot pulse. Further, a shock wave can be more reliably increased due to the main pulse.

Also, the peak intensity of the foot pulse may be 2% or more and less than 100%, when the peak intensity of the main pulse is 100%. Within this range, plasma due to the foot pulse can be suitably generated on the surface of the workpiece. Also, burning of the surface of the workpiece due to the foot pulse and the main pulse can be suppressed.

Also, a time interval between a peak position of the foot pulse and the peak position of the main pulse may be 1 ns or more and 20 ns or less. In this case, the main pulse can be reliably positioned in the retention time period of the plasma.

A laser processing method according to an aspect of the present disclosure is a laser processing method which performs processing by irradiating a workpiece with a laser light and includes a waveform control step of controlling a pulse waveform of the laser light irradiating the workpiece, and an irradiation step of irradiating the workpiece with the laser light whose pulse waveform is controlled in the waveform control step, in which, in the waveform control step, a main pulse and a foot pulse temporally preceding the main pulse are formed into the pulse waveform of the laser light in the waveform control step, and a peak intensity of the foot pulse is made smaller than a peak intensity of the main pulse, and a peak position of the main pulse is made to be positioned in a retention time period of plasma generated due to an incidence of the foot pulse on the workpiece.

In this laser processing method, plasma having a sufficiently low density with respect to the workpiece is generated on the surface of the workpiece by irradiating the workpiece with the foot pulse temporally earlier than the main pulse. Thereafter, by irradiating the workpiece with the main pulse having a peak intensity higher than that of the foot pulse in the retention time period of the plasma, the plasma acts as a low-density ablator and a strong shock wave increased by a difference in shock impedance can be generated inside the workpiece. Thereby, in this laser processing method, a residual stress can be generated deep inside the workpiece.

Also, a single main pulse and a single foot pulse may be formed into the pulse waveform of the laser light in the waveform control step. Thereby, plasma can be more reliably generated on the surface of the workpiece by the foot pulse. Further, a shock wave can be more reliably increased due to the main pulse.

Also, the peak intensity of the foot pulse may be set to 2% or more and less than 100%, when the peak intensity of the main pulse is taken as 100% in the waveform control step. Within this range, plasma due to the foot pulse can be suitably generated on the surface of the workpiece. Further, when the plasma due to the foot pulse is used, even with a peak intensity to such an extent that the surface of the workpiece cannot be burned, a residual stress can be generated sufficiently deep in the workpiece.

Also, a time interval between a peak position of the foot pulse and the peak position of the main pulse may be set to 1 ns or more and 20 ns or less in the waveform control step. In this case, the main pulse can be reliably positioned in the retention time period of the plasma.

Also, irradiation of the surface of the workpiece with the laser light may be performed in a state in which a protective film is formed thereon in the irradiation step. Thereby, plasma can be generated more reliably on the surface of the workpiece. Further, burning of the surface of the workpiece can be more reliably suppressed by the protective film.

Also, irradiation of the surface of the workpiece with the laser light may be performed in a state in which a plasma confinement film is formed thereon in the irradiation step. As a result, a shock wave generated by radiation of the laser light can be efficiently transmitted to the inside of the workpiece.

DETAILED DESCRIPTION

Hereinafter, preferred embodiments of a laser processing apparatus and a laser processing method according to one aspect of the present disclosure will be described in detail with reference to the drawings.

Figure 1:
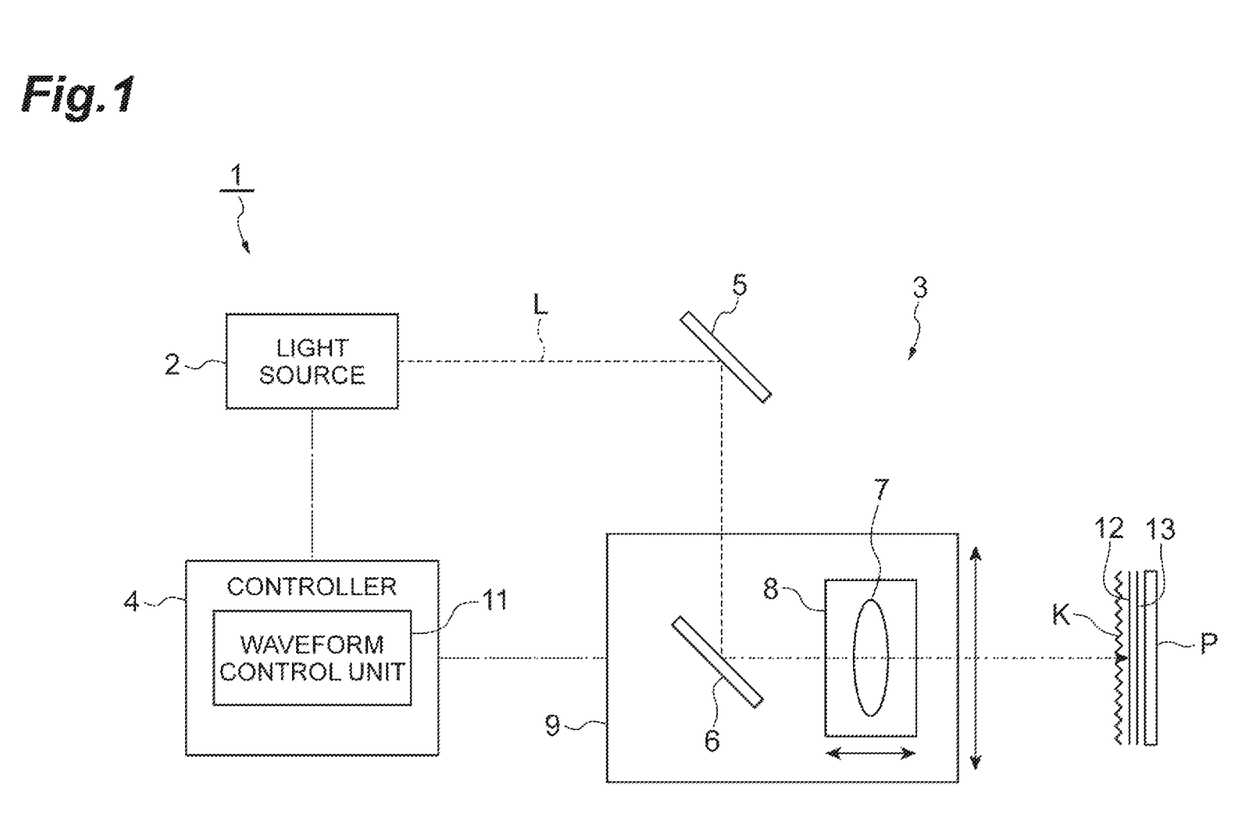
FIG. 1 is a schematic configuration view illustrating an embodiment of a laser processing apparatus.

FIG. 1 is a schematic view illustrating an embodiment of a laser processing apparatus. As illustrated in FIG. 1, the laser processing apparatus 1 is configured to include a light source 2, a light guide optical system 3, and a controller 4. The laser processing apparatus 1 is an apparatus in which a surface of a workpiece P such as a metal is irradiated with laser light L to generate plasma on the surface of the material and the material is plastically deformed at a predetermined processing depth with a shock wave generated by a plasma pressure.

The workpiece P is an object made of metallic materials of various types such as copper, aluminum, iron, or the like. The workpiece P is placed in an atmosphere such as atmospheric air, a vacuum, water, pressurized water, or the like. For example, when water or pressurized water is used, a plasma confinement film 12 having an action of confining plasma on the surface of the workpiece P is formed by these media. The plasma confinement film 12 is not limited to a case in which a medium such as water or the like is used, and may be formed by bonding a transmission material through which the laser light L can be transmitted such as quartz glass or sapphire glass to the surface of the workpiece P. Also, a protective film 13 may be formed on the surface of the workpiece P. The protective film 13 can be formed of a tape or a coating material having a thickness of, for example, about several hundred micrometers.

The light source 2 is a light source that outputs the laser light L. Types of the light source 2 are not particularly limited, and various types of light source can be used according to a material of the workpiece P. A wavelength of the light source 2 is selected within a range which is able to be absorbed by a constituent material of the workpiece P. An operation of the light source 2 and an output state of the laser light L are controlled by the controller 4. The laser light L is, for example, a pulsed light. As an example, a repetition frequency of the laser light L may be 1 Hz.

The light guide optical system 3 may be configured to include, for example, a pair of reflecting mirrors 5 and 6, and a condenser lens 7. The reflecting mirror 5 reflects the laser light L emitted from the light source 2 toward the reflecting mirror 6 at substantially a right angle. Also, the reflecting mirror 6 reflects the laser light L reflected by the reflecting mirror 5 toward the condenser lens 7 at a substantially right angle. The condenser lens 7 condenses the laser light L reflected by the reflecting mirror 6 toward the workpiece P.

A condensed spot diameter of the laser light L due to the condenser lens 7 is preferably 100 μm or more, for example. Further, a spot shape of the laser light L on the surface of the workpiece P is normally circular, but it may be elliptical, rectangular, or linear. When a spot shape of the laser light L is rectangular or linear, for example, even when a rectangular corner portion or the like due to a step is present on the workpiece P, process leakage at the portion can be eliminated.

The condenser lens 7 is provided on a movable stage 8. The condenser lens 7 and the reflecting mirror 6 on the movable stage 8 are provided on a movable stage 9. Operations of the movable stages 8 and 9 are controlled by the controller 4. A light condensing position of the laser light L in the vicinity of the workpiece P is adjusted, for example, when the condenser lens 7 is driven in an optical axis direction of the laser light L by the movable stages 8. Further, the surface of the workpiece P is scanned with the laser light L, for example, when the reflecting mirror 6 and the condenser lens 7 are driven in an in-plane direction of the surface of the workpiece P by the movable stage 9.

The controller 4 is a unit that controls irradiation conditions of the laser light L irradiating the workpiece P. The controller 4 is physically a computer system configured to include a processor, a memory, and the like. A display device such as a monitor, an input device such as a keyboard/mouse, and the like are connected to the controller 4. The controller 4 executes control functions of various types using the processor. The controller 4 may be configured by an integrated circuit such as a field-programmable gate array (FPGA).

Functionally, the controller 4 includes a waveform control unit 11 that controls a pulse waveform of the laser light L output from the light source 2. There is no particular limitation on a method of controlling (shaping) a pulse waveform using the waveform control unit 11, but, for example, an optical method such as multiplexing of a plurality of laser light having different pulse widths may be used, and an electrical method such as input of a driving signal to the light source 2 may be used.

Figure 2:
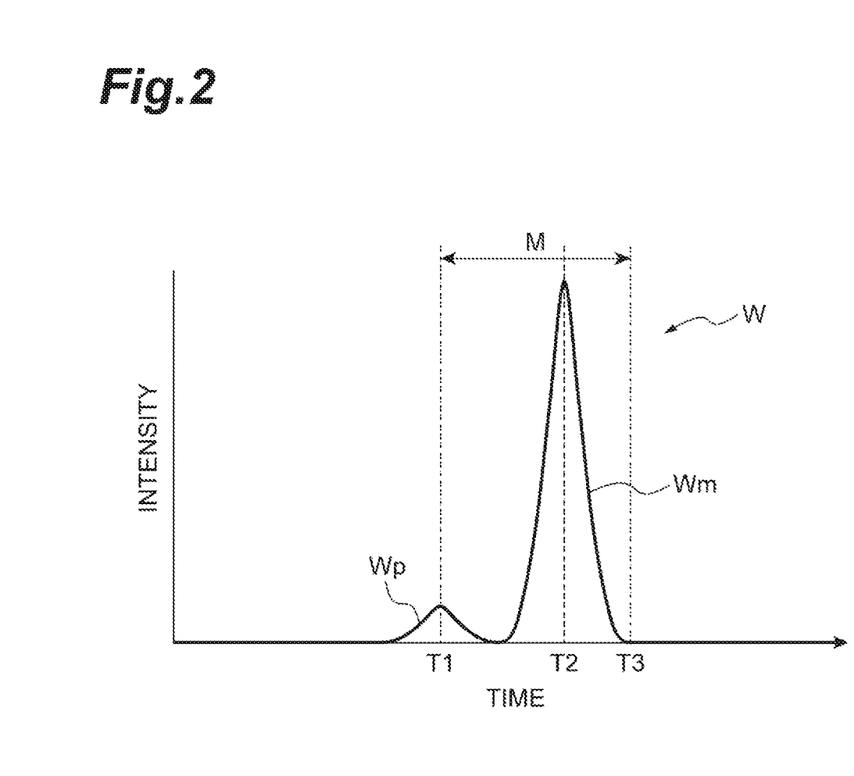
FIG. 2 is a schematic view showing an example of a pulse waveform of laser light controlled by a waveform control unit.

FIG. 2 is a schematic view showing an example of a pulse waveform of the laser light L controlled by the waveform control unit 11. In FIG. 2, a horizontal axis represents time and a vertical axis illustrates intensity. As shown in FIG. 2, a pulse waveform W includes a main pulse Wm and a foot pulse Wp temporally preceding the main pulse Wm. In an example of FIG. 2, the pulse waveform W is formed by the single main pulse Wm and the single foot pulse Wp. Also, both the main pulse Wm and the foot pulse Wp have a Gaussian shape.

The foot pulse Wp is incident on the workpiece P temporally earlier than the main pulse Wm and causes plasma K having a sufficiently low density with respect to the workpiece P to be generated on the surface of the workpiece P. A pulse width (full width at half maximum) of the foot pulse Wp may be, for example, 1 ns to 20 ns. The main pulse Wm is incident on the workpiece P temporally later than the foot pulse Wp and causes a shock wave to be generated inside the workpiece P. A pulse width (full width at half maximum) of the main pulse Wm may be, for example, 1 ns to 20 ns. Further, a peak intensity of the foot pulse Wp is smaller than a peak intensity of the main pulse Wm. The peak intensity of the foot pulse Wp may be, for example, 2% or more and less than 100%, when the peak intensity of the main pulse Wm is 100%.

A peak position of the main pulse Wm is positioned in a retention time period M of the plasma K generated due to the incidence of the foot pulse Wp on the workpiece P. Generation of the plasma K due to the foot pulse Wp can be regarded as being coincident with a time at which the peak of the foot pulse Wp is incident on the workpiece P. Therefore, when a time corresponding to a peak position of the foot pulse Wp is T1, a time corresponding to the peak position of the main pulse Wm is T2, and an extinction time of the plasma K generated due to the incidence of the foot pulse Wp to the workpiece P is T3, the time T2 is a time between the time T1 and the time T3.

A time interval (T2−T1) between the peak position of the foot pulse Wp and the peak position of the main pulse Wm may be, for example, 1 ns or more and 20 ns or less. Although it depends on types of the workpiece P, the protective film 13, and the plasma confinement film 12, when the retention time period M of the plasma K is, for example, about tens of nanoseconds, the time interval (T2−T1) between the peak position of the foot pulse Wp and the peak position of the main pulse Wm may be set to, for example, 20 ns. Further, a skirt portion of the main pulse Wm and a skirt portion of the foot pulse Wp may temporally overlap with each other or may be separated.

The laser processing method using the above-described laser processing apparatus 1 is configured to include a waveform control step of controlling the pulse waveform W of the laser light L irradiating the workpiece P, and an irradiation step of irradiating the workpiece P with the laser light L whose pulse waveform is controlled in a waveform control step.

In the waveform control step, the above-described single main pulse Wm and the single foot pulse Wp temporally preceding the main pulse Wm are formed into the pulse waveform W of the laser light L. In the waveform control step, a peak intensity of the foot pulse Wp is made smaller than a peak intensity of the main pulse Wm, and the peak position of the main pulse Wm is made to be positioned in the retention time period M of the plasma K generated due to the incidence of the foot pulse Wp on the workpiece P. Further, in the waveform control step, the peak intensity of the foot pulse Wp is set to 2% or more and less than 100%, when the peak intensity of the main pulse Wm is 100%, and a time interval between the peak position of the foot pulse Wp and the peak position of the main pulse Wm is set to 1 ns or more and 20 ns or less.

In the irradiation step, radiation of the laser light L whose pulse waveform W is controlled is performed in a state in which the protective film 13 and the plasma confinement film 12 have been formed on the surface of the workpiece P in advance. In the irradiation step, the foot pulse Wp is incident on the workpiece P temporally earlier than the main pulse Wm and causes plasma K having a sufficiently low density with respect to the workpiece P to be generated on the surface of the workpiece P. Thereafter, with the plasma K maintained on the surface of the workpiece P, the main pulse Wm is incident on the workpiece P and causes a shock wave to be generated inside the workpiece P.

As described above, in the laser processing apparatus 1, the plasma K having a sufficiently low density with respect to the workpiece P is generated on the surface of the workpiece P by irradiating the workpiece P with the foot pulse Wp temporally earlier than the main pulse Wm. Thereafter, by irradiating the workpiece P with the main pulse Wm having a peak intensity higher than that of the foot pulse Wp in the retention time period M of the plasma K, the plasma K acts as a low-density ablator and a strong shock wave increased by a difference in shock impedance can be generated inside the workpiece P. Thereby, in the laser processing apparatus 1, a residual stress can be generated deep inside the workpiece P.

Also, in the present embodiment, the pulse waveform W of the laser light L is configured by the single main pulse Wm and the single foot pulse Wp. Thereby, plasma can be more reliably generated on the surface of the workpiece P by the foot pulse Wp. Further, a shock wave can be more reliably increased due to the main pulse Wm.

Also, in the present embodiment, the peak intensity of the foot pulse Wp is 2% or more and less than 100%, when the peak intensity of the main pulse Wm is 100%. Within this range, plasma due to the foot pulse Wp can be suitably generated on the surface of the workpiece P. Also, when the plasma due to the foot pulse Wp is used, even with a peak intensity to such an extent that the surface of the workpiece P is not burned, a residual stress can be generated sufficiently deep in the workpiece P. Further, in the present embodiment, the time interval (T2−T1) between the peak position of the foot pulse Wp and the peak position of the main pulse Wm is 1 ns or more and 20 ns or less. Thereby, the main pulse Wm can be reliably positioned in the retention time period M of the plasma.

Next, an effect confirmation test of the present disclosure will be described.

This test measured a distribution of a residual stress generated in a workpiece in a case in which a foot pulse was used (Example) and in a case in which a foot pulse was not used (Comparative examples). In Comparative example 1, a protective film and a plasma confinement film were formed on a surface of a workpiece, and the workpiece was irradiated with laser light having a pulse waveform including only a main pulse. In Comparative example 2, only a plasma confinement film was formed on a surface of a workpiece, and the workpiece was irradiated with laser light having a pulse waveform including only a main pulse. In Example, a protective film and a plasma confinement film were formed on a surface of a workpiece, and the workpiece was irradiated with laser light having a pulse waveform including both a main pulse and a foot pulse. For the workpieces, chrome niobden steel having been subjected to an annealing treatment was used. An oil-based black paint was used for the protective film, and water was used for the plasma confinement film.

Figure 3:
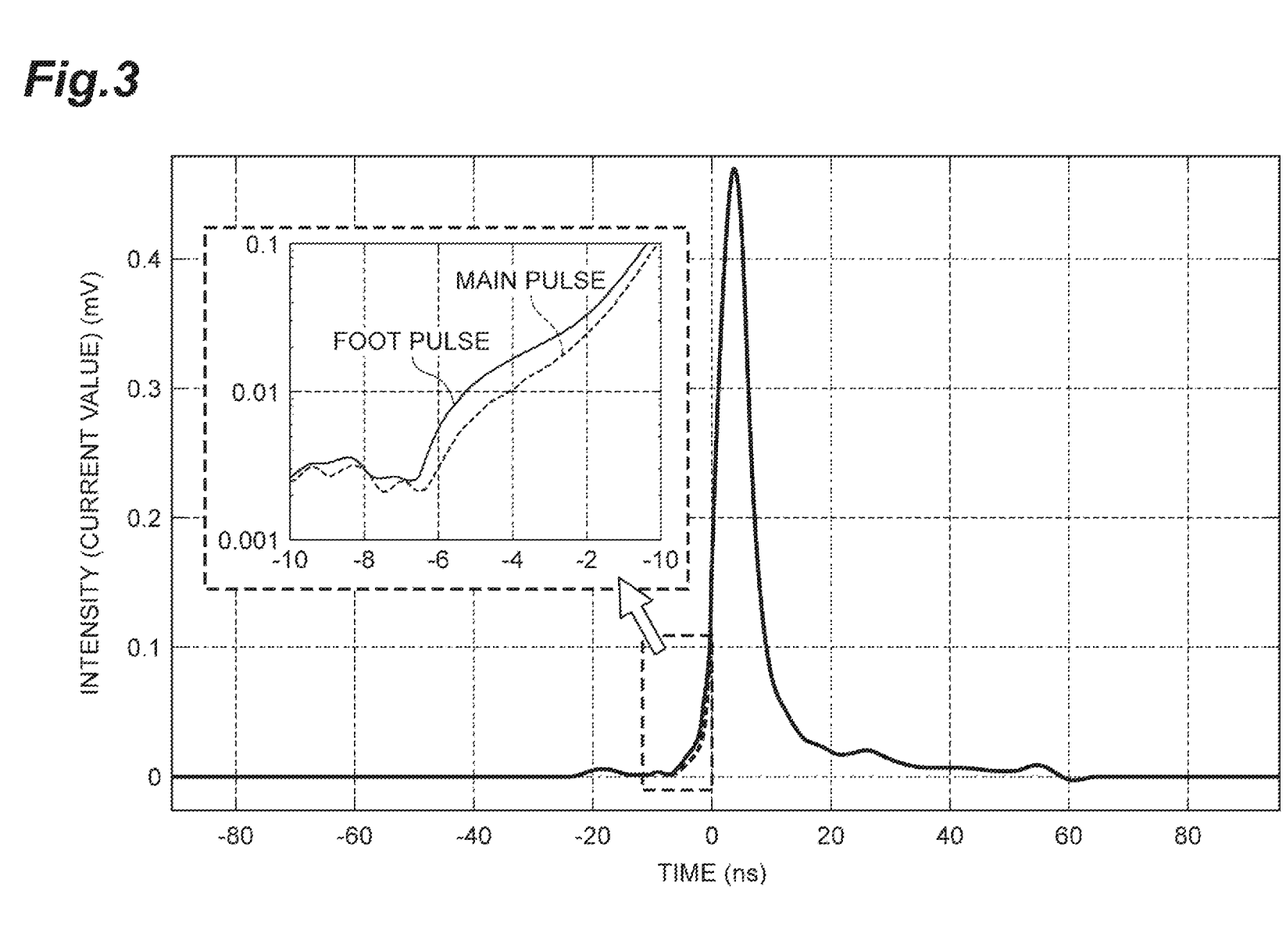
FIG. 3 is a view showing a pulse waveform of laser light used in an effect confirmation test.

FIG. 3 is a view showing a pulse waveform of laser light used in the effect confirmation test. As shown in FIG. 3, in the laser light used in Example, the foot pulse preceded the main pulse in time by about 5 ns, and a ratio between a peak intensity of the main pulse and a peak intensity of the foot pulse was about 1:49. Also, as common conditions of Example and Comparative examples, a pulse width (full width at half maximum) of the main pulse was 5 ns, a cross-sectional shape of the laser light was 5 mm square, a power density of the laser light was 3.8 GW/cm$^2$, and the number of shots was five. Further, a residual stress (initial value of a residual stress) of a surface of the workpiece after the annealing treatment was about −90 MPa.

Figure 4:
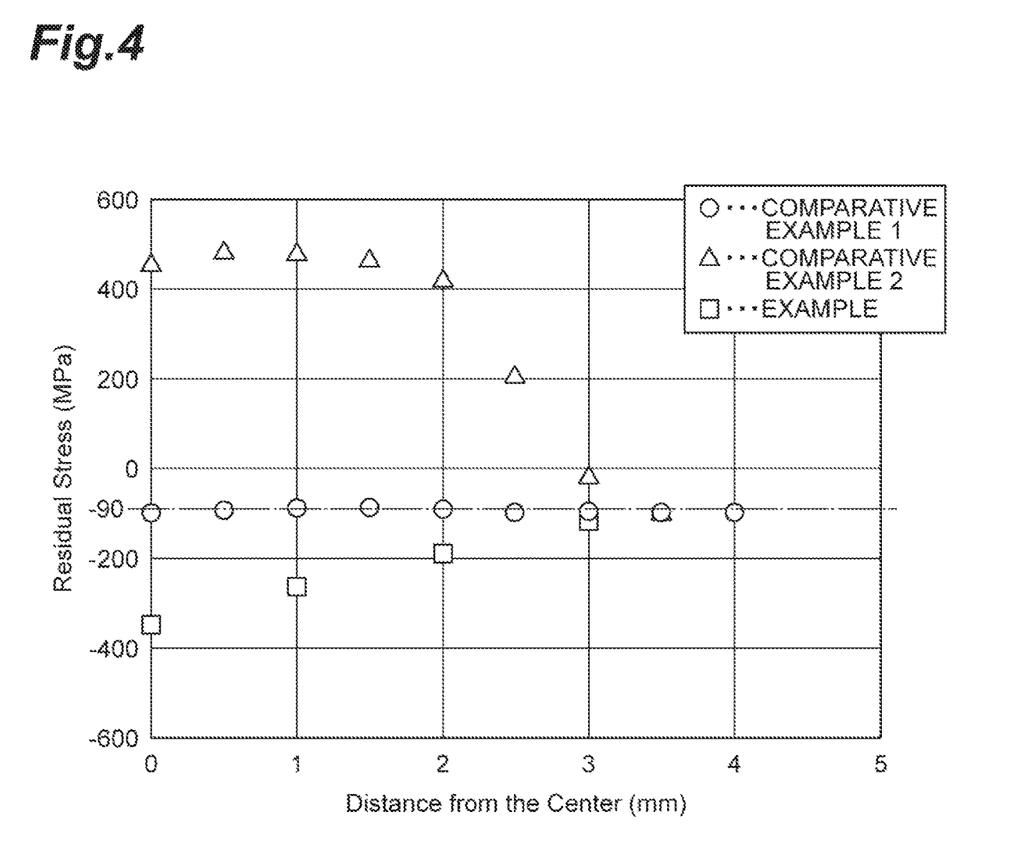
FIG. 4 is a view showing a stress state in a surface direction (X direction) of workpieces in Example and Comparative examples.
Figure 5:
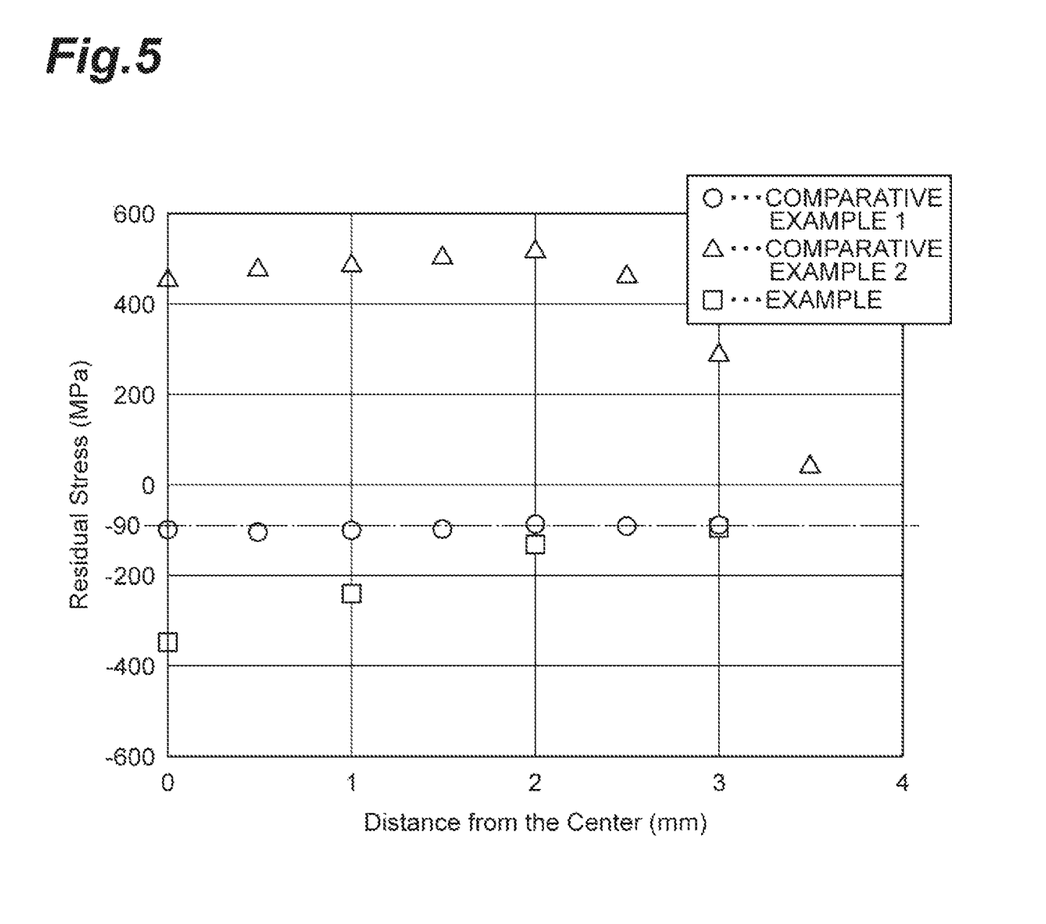
FIG. 5 is a view showing a stress state in a surface direction (Y direction) of workpieces in Example and Comparative examples.

FIG. 4 is a view showing a stress state in a surface direction (X direction) of the workpieces in Example and Comparative examples. Also, FIG. 5 is a view showing a stress state in a surface direction (Y direction) of the workpieces in Example and Comparative examples. When a residual stress is a negative value, this represents a compressive stress, and when a residual stress is a positive value, this represents a tensile stress.

As shown in FIG. 4, in the X direction, in Comparative example 1, a residual stress of the workpiece was substantially constant in a range from a center to 4 mm and remained at about −90 MPa to −100 MPa. Also, in Comparative example 2, a residual stress of the workpiece was a high positive value near a center and remained at about +400 MPa to +500 MPa in a range from a center to 2 mm, and gradually decreased in a range from the center to 2 mm to 3 mm and remained at about 0 MPa to +100 MPa. In Comparative example 2, it is presumed that burning occurred in the workpiece due to a main pulse, and thereby a tensile stress opposite to a compressive stress remained.

On the other hand, in Example, although a residual stress gradually decreased in a range from a center to 3 mm, the residual stress was about −350 MPa at the center, about −260 MPa at a position 1 mm from the center, and about −190 MPa at a position 2 mm from the center. Therefore, it was ascertained that a distinctly high compressive stress remained extending from the center in the X direction as compared with the cases of Comparative examples 1 and 2.

As shown in FIG. 5, in the Y direction, in Comparative example 1, a residual stress of the workpiece was substantially constant in a range from the center to 4 mm and remained at about −90 MPa to −100 MPa. Also, in Comparative example 2, a residual stress of the workpiece was a high positive value near the center and remained at about +450 MPa to +500 MPa in a range from the center to 2 mm, and gradually decreased in a range from 2 mm to 3.5 mm from the center and remained at about +40 MPa to +460 MPa. In Comparative example 2, as in the case of the X direction, it is presumed that burning occurred in the workpiece due to a main pulse, and thereby a tensile stress opposite to a compressive stress remained.

On the other hand, in Example, although the residual stress gradually decreased in a range from the center to 3 mm, the residual stress was about −350 MPa at the center, about −240 MPa at a position 1 mm from the center, and about −130 MPa at a position 2 mm from the center. Therefore, it was ascertained that a distinctly high compressive stress remained extending from the center in the Y direction as compared with the cases of Comparative examples 1 and 2.

Figure 6:
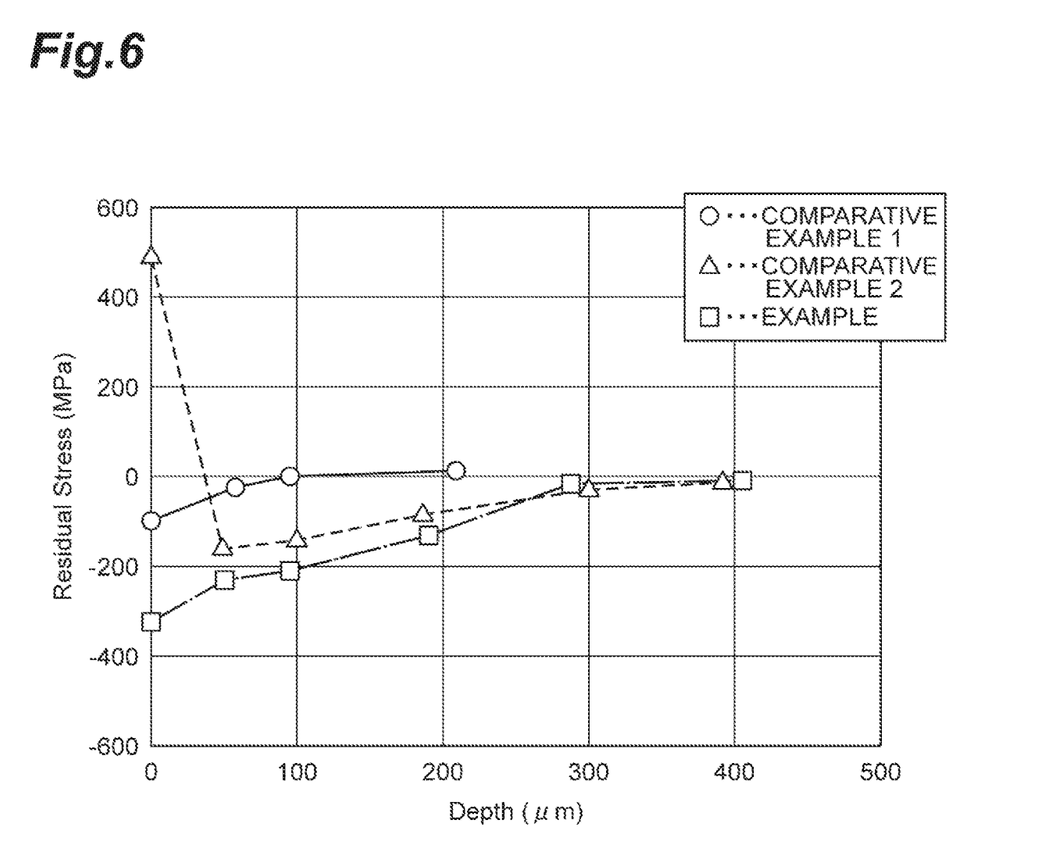
FIG. 6 is a view showing a stress state in a depth direction (Z direction) of workpieces in Example and Comparative examples.

Further, FIG. 6 is a view showing a stress state in a depth direction (Z direction) of the workpieces in Example and Comparative examples. Also in FIG. 6, when a residual stress is a negative value, this represents a compressive stress, and when a residual stress is a positive value, this represents a tensile stress.

As shown in FIG. 6, in the Z direction, in Comparative example 1, a residual stress was about −100 MPa at a surface position and was almost 0 MPa in a depth of 100 μm or below. Also, in Comparative example 2, it was ascertained that a residual stress at a surface position was about +500 μm and strong burning occurred in the workpiece. Although the compressive stress remained inside the workpiece, the compressive stress was about −180 MPa at a depth of 50 μm, about −150 MPa at a depth of 100 μm, about −80 MPa at a depth of 200 μm, and almost 0 MPa at a depth of 300 μm.

On the other hand, in Example, a compressive stress was about −330 MPa at a surface position, about −230 MPa at a depth of 50 μm, about −210 MPa at a depth of 100 μm, about −130 MPa at a depth of 200 μm, and about −20 MPa at a depth of 300 μm, and it was ascertained that a distinctly high compressive stress remained in the Z direction when any of those described above was compared with those in the cases of Comparative examples 1 and 2.

As described above, in the laser processing apparatus 1, plasma having a sufficiently low density with respect to the workpiece P is generated on the surface of the workpiece P by irradiating the workpiece P with the foot pulse Wp temporally earlier than the main pulse Wm. Thereafter, by irradiating the workpiece P with the main pulse Wm having a peak intensity higher than that of the foot pulse Wp in the retention time period M of the plasma K, the plasma K acts as a low-density ablator and a strong shock wave increased by a difference in shock impedance can be generated inside the workpiece P. Thereby, in the laser processing apparatus 1, a residual stress can be generated deep inside the workpiece P.

Also, in the present embodiment, the pulse waveform W of the laser light L includes the single main pulse Wm and the single foot pulse Wp. Thereby, plasma K can be more reliably generated on the surface of the workpiece P by the foot pulse Wp. Further, a shock wave can be more reliably increased due to the main pulse Wm.

Also, in the present embodiment, the peak intensity of the foot pulse Wp is 2% or more and less than 100%, when the peak intensity of the main pulse Wm is 100%. When this range is employed, the plasma K due to the foot pulse Wp can be suitably generated on the surface of the workpiece P. Also, burning of the surface of the workpiece P due to the foot pulse Wp and the main pulse Wm can be suppressed. Even when the protective film 13 is provided on the surface of the workpiece P, it is conceivable that the surface of the workpiece P may be made into plasma together with the protective film 13 depending on peak intensities of the main pulse Wm and the foot pulse Wp, but such a situation can be suitably avoided in a range described above.

In the present embodiment, the time interval (T2−T1) between the peak position of the foot pulse Wp and the peak position of the main pulse Wm is 1 ns or more and 20 ns or less. Thereby, the main pulse Wm can be reliably positioned in the retention time period M of the plasma K.

The present disclosure is not limited to the above-described embodiment. For example, in the above-described embodiment, the plasma confinement film 12 and the protective film 13 are formed on the surface of the workpiece P, but these films are not necessarily formed. Also, in the above-described embodiment, the pulse waveform W of the laser light L includes the single main pulse Wm and the single foot pulse Wp, but a plurality of foot pulses Wp may be combined with a single main pulse Win. When a plurality of foot pulses Wp are used, peak intensities of these foot pulses Wp may be the same as each other, or the peak intensities may gradually increase from the temporally preceding foot pulse Wp in sequence. Further, the main pulse Wm and the foot pulse Wp are not limited to a Gaussian shape, and may be other shapes such as a rectangular wave shape, a sine wave shape, or the like, or may be a combination thereof.

EXPLANATION OF REFERENCES

1 Laser processing apparatus
2 Light source

11 Waveform control unit
12 Plasma confinement film
13 Protective film
K Plasma
M Retention time period
L Laser light
P Workpiece
W Pulse waveform
Wm Main pulse
Wp Foot pulse

What is claimed is:

1. A laser processing apparatus which performs laser peening by irradiating a workpiece with a laser light, the laser processing apparatus comprising:
   a light source which outputs the laser light; and
   a waveform controller which controls a pulse waveform of the laser light irradiating the workpiece, wherein
   the pulse waveform of the laser light controlled by the waveform controller includes a main pulse incident on the workpiece that plastically deforms the workpiece and a foot pulse temporally preceding the main pulse that generates plasma on a surface of the workpiece, and
   a peak intensity of the foot pulse is smaller than a peak intensity of the main pulse, and a peak position of the main pulse is positioned in a retention time period of the plasma generated due to an incidence of the foot pulse on the workpiece.

2. The laser processing apparatus according to claim 1, wherein the pulse waveform of the laser light includes a single main pulse and a single foot pulse.

3. The laser processing apparatus according to claim 1, wherein the peak intensity of the foot pulse is 2% or more and less than 100%, when the peak intensity of the main pulse is 100%.

4. The laser processing apparatus according to claim 1, wherein a time interval between a peak position of the foot pulse and the peak position of the main pulse is 1 ns or more and 20 ns or less.

5. A laser processing method which performs laser peening by irradiating a workpiece with a laser light, the laser processing method comprising:
   a waveform control step of controlling a pulse waveform of the laser light irradiating the workpiece; and
   an irradiation step of irradiating the workpiece with the laser light whose pulse waveform is controlled in the waveform control step, wherein, in the waveform control step,
   a main pulse incident on the workpiece to plastically deform the workpiece and a foot pulse temporally preceding the main pulse to generate plasma on a surface of the workpiece are formed into the pulse waveform of the laser light in the waveform control step, and
   a peak intensity of the foot pulse is made smaller than a peak intensity of the main pulse, and a peak position of the main pulse is made to be positioned in a retention time period of the plasma generated due to an incidence of the foot pulse on the workpiece.

6. The laser processing method according to claim 5, wherein a single main pulse and a single foot pulse are formed into the pulse waveform of the laser light in the waveform control step.

7. The laser processing method according to claim 5, wherein the peak intensity of the foot pulse is set to 2% or more and less than 100%, when the peak intensity of the main pulse is 100% in the waveform control step.

8. The laser processing method according to claim 5, wherein a time interval between a peak position of the foot pulse and the peak position of the main pulse is set to 1 ns or more and 20 ns or less in the waveform control step.

9. The laser processing method according to claim 5, wherein irradiation of a surface of the workpiece with the laser light is performed in a state in which a protective film is formed thereon in the irradiation step.

10. The laser processing method according to claim 5, wherein irradiation of the workpiece with the laser light is performed in a state in which a plasma confinement film is formed thereon in the irradiation step.

* * * * *